United States Patent [19]
Befort et al.

[11] Patent Number: 4,729,524

[45] Date of Patent: Mar. 8, 1988

[54] SEAT BELT RETRACTOR WITH CINCH MECHANISM

[75] Inventors: Horst U. Befort; Keith Charlton, both of Midland; Kevin Desrochers, Port McNicoll, all of Canada

[73] Assignee: TRW Vehicle Safety Systems Limited, Toronto, Canada

[21] Appl. No.: 913,214

[22] Filed: Sep. 26, 1986

[51] Int. Cl.[4] .............. A62B 35/02; B65H 75/48; B60R 22/34

[52] U.S. Cl. .............. 242/107.4 R; 242/107.4 A; 280/806; 280/807; 297/476; 297/480

[58] Field of Search ............. 242/107.4 R, 107.4 A, 242/107.4 B, 107.4 D, 107.7, 107.6, 107; 280/806–808, 801; 297/483, 474–480

[56] References Cited

U.S. PATENT DOCUMENTS

| | | | |
|---|---|---|---|
| 4,391,421 | 7/1983 | Naitoh et al. | 242/107.7 |
| 4,427,164 | 1/1984 | Rumpf | 242/107.4 R |
| 4,436,255 | 3/1984 | Matsui et al. | 242/107.4 A |
| 4,518,132 | 5/1985 | Schmidt | 242/107.4 A |
| 4,573,646 | 3/1986 | Willey | 242/107.4 A |

Primary Examiner—David Werner
Attorney, Agent, or Firm—Tarolli, Sundheim & Covell

[57] ABSTRACT

A seat belt retractor includes a spool with seat belt webbing wound thereon. A frame supports the spool for rotation in a belt withdrawal direction or a belt retraction direction. A pawl engages ratchet teeth formed on end portions of the spool to prevent rotation of the spool in the belt withdrawal direction when a predetermined amount of seat belt webbing is withdrawn from the spool. A cam which has a multi-loop cam groove is rotatably driven by a gear train in response to spool rotation. A lever with a cam follower portion in the cam groove is pivoted by the cam to move the pawl into engagement with the ratchet teeth.

10 Claims, 11 Drawing Figures

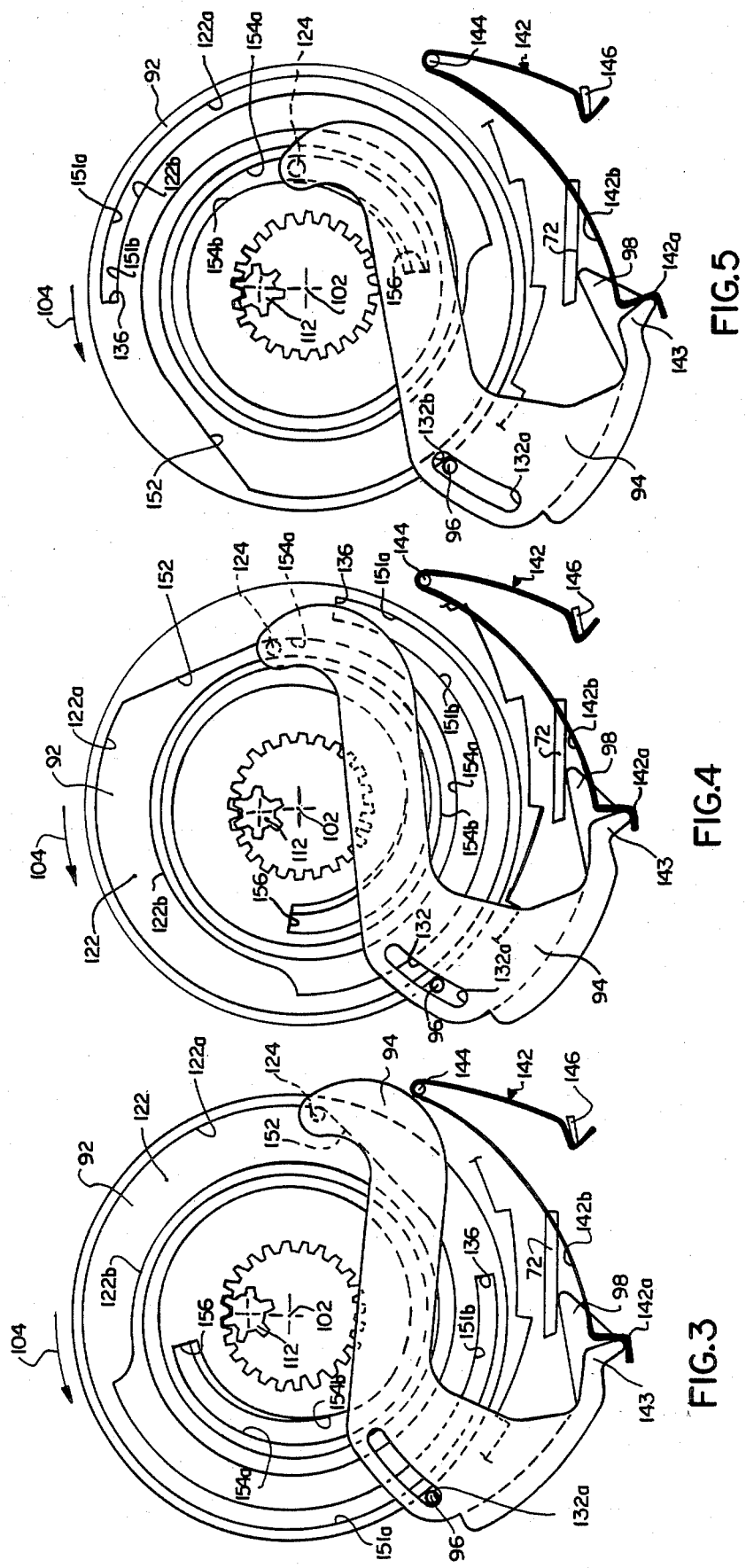

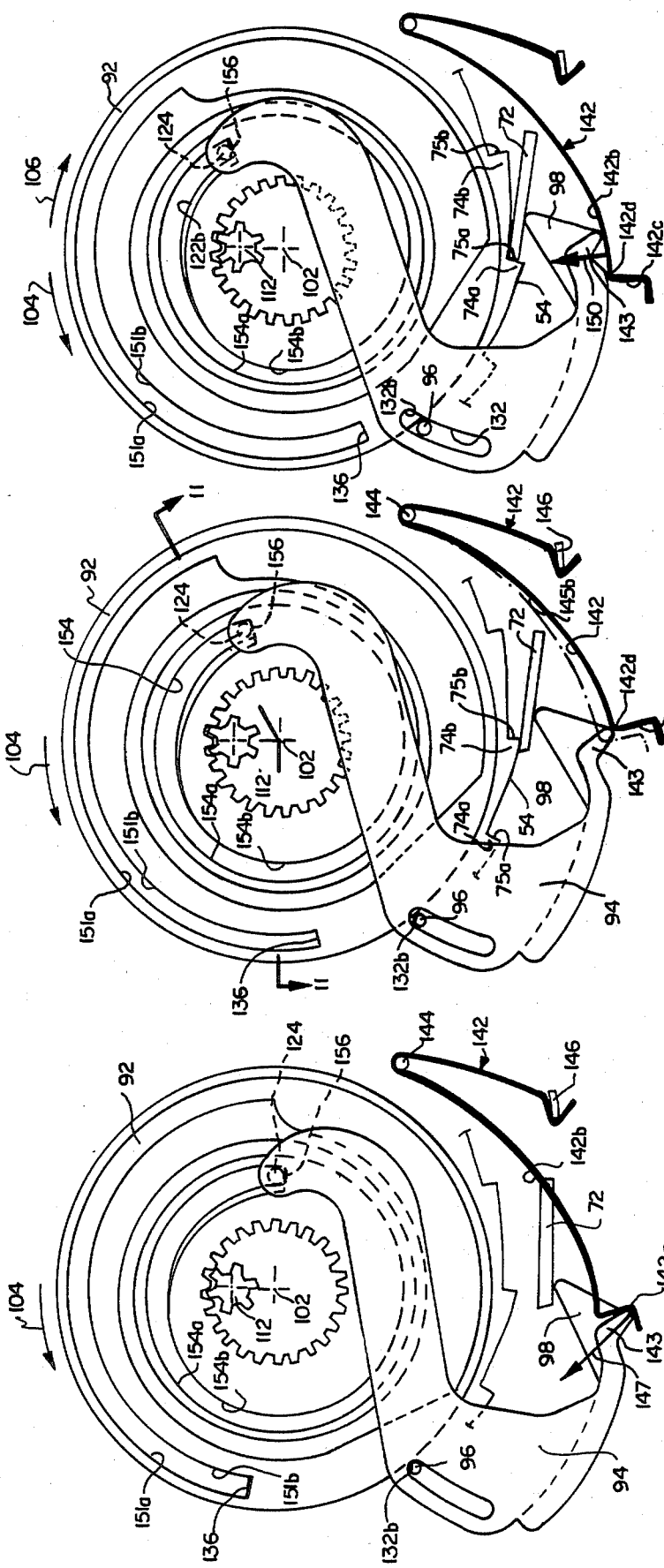

SEAT BELT RETRACTOR WITH CINCH MECHANISM

BACKGROUND OF THE INVENTION

The present invention relates to a seat belt retractor and, in particular, to a seat belt retractor which automatically locks the retractor spool from rotation in a seat belt withdrawal direction upon withdrawal of a predetermined amount of seat belt webbing from the spool.

Seat belt retractors which automatically lock the retractor spool from rotation in a seat belt withdrawal direction upon withdrawal of a predetermined amount of seat belt webbing from the retractor are known. These retractors are used, for example, to lock (cinch) a child seat firmly in an automotive vehicle. Such retractors are shown in U.S. Pat. No. 4,436,255 and in Higbee U.S. application Ser. No. 589,679, filed Mar. 15, 1984.

In the known retractors, the seat belt webbing is wound about a spool. The spool is supported for rotation, and upon withdrawal of the seat belt webbing, the spool rotates in a belt withdrawal direction. A ratchet is fixed to the spool and rotates with the spool. The spool is locked from rotation in the belt withdrawal direction by a pawl which moves into engagement with the ratchet. The pawl is moved into engagement with the ratchet after a predetermined amount of belt withdrawal. In U.S. Pat. No. 4,436,255 and in the aforementioned Higbee application, the pawl is moved into engagement with the ratchet in response to rotation of a cam. The cam is rotated by a drive mechanism which drives the cam upon rotation of the spool.

SUMMARY OF THE INVENTION

The present invention is directed to a seat belt retractor which automatically locks to prevent seat belt withdrawal upon withdrawal of a predetermined amount of seat belt webbing. The retractor has a spool on which seat belt webbing is wound. A ratchet is fixed to the spool. A pawl is movable into engagement with the ratchet to prevent rotation of the spool and withdrawal of the seat belt webbing. The retractor has an inertia weight and a cam member, both of which effect movement of the pawl into engagement with the ratchet. The inertia weight effects movement of the pawl upon deceleration of the vehicle above a predetermined rate. The cam member effects movement of the pawl upon withdrawal of a predetermined amount of seat belt webbing from the retractor. The cam member is rotated in response to rotation of the spool. The cam member has a multi-loop cam groove extending around the axis of rotation of the cam member. The cam member is rotated a plurality of times before the belt webbing is withdrawn the predetermined amount, at which time the locking pawl locks the spool from further withdrawal. The retractor has a drive for rotating the cam member upon rotation of the spool. A drive ratio of approximately 4:1 is provided between the spool and the cam member.

The cam member cooperates with a lever which has a cam follower portion for engaging surfaces defining the cam groove. A V-shaped spring has one portion that engages one part of the lever to keep it in an initial position. As the cam member rotates in response to belt withdrawal, the lever moves from its initial position. During rotation of the cam member, the lever pivots as a result of engagement of the cam follower portion of the lever with a lever actuating surface defining the cam groove. The pivoting movement of the lever moves the pawl into engagement with the ratchet. A second portion of the spring then maintains the pawl in engagement with the ratchet. While the pawl engages the ratchet, the belt webbing can be retracted but cannot be further withdrawn.

Thus, in a seat belt system that incorporates a retractor according to the present invention, the belt can be buckled and retracted around an occupant or a baby seat, and the occupant or baby seat will be locked (cinched) in position. When the belt is unbuckled, the belt webbing can be further retracted onto the spool. Upon a predetermined amount of belt retraction, a cam surface portion of the cam groove pivots the lever back to its initial position.

BRIEF DESCRIPTION OF THE DRAWINGS

The foregoing and other features and advantages of the present invention will become apparent to those skilled in the art to which the invention relates upon reading the following description of a preferred embodiment with reference to the accompanying drawings, wherein:

FIGS. 3–10 are schematic side views similar to FIG. 2 and illustrating parts of the retractor of FIG. 1 in different positions.

DESCRIPTION OF A PREFERRED EMBODIMENT

Figure 1:
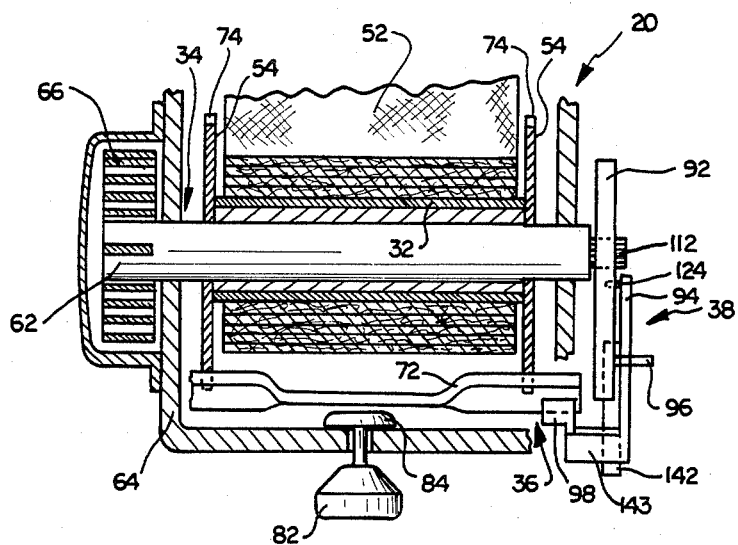
FIG. 1 is a schematic view partly in section illustrating a seat belt retractor embodying the present invention.

The present invention relates to a seat belt retractor having a mechanism which locks to prevent further withdrawal of the seat belt in response to withdrawal of a predetermined amount of belt webbing. The invention may be applied to retractors of various construction. For purposes of illustration, the invention is shown in the drawings as embodied in a seat belt retractor 20.

The seat belt retractor 20 includes a spool 32 having seat belt webbing 52 wound thereon. The spool 32 has ratchets 54 fixed to each end of the spool. The ratchets 54 are spaced apart a distance slightly greater than the width of the seat belt webbing 52 in order to guide the webbing around the spool 32.

A support mechanism 34 supports the spool 32 for rotation and includes a shaft 62 and a frame 64. The shaft 62 is connected by a key or the like (not shown) to the spool 32 and is coaxial with the spool. The shaft 62 is supported for rotation in the frame 64. The frame 64 is attached to a vehicle in which the retractor is used. A coiled spring 66 has one end connected with the shaft 62 and its other end connected with the frame 64. The spring 66 applies force to the shaft 62 to bias the shaft 62 in a belt retraction direction.

A locking mechanism 36, when actuated, prevents the spool 32 from rotating in a belt withdrawal direction. The locking mechanism 36 includes a locking pawl 72 which is movable into engagement with ratchet teeth 74 on the outer circumference of the ratchets 54. The locking pawl 72 is supported by a portion (not shown)

of the frame 64 for pivotal movement relative thereto, as is known.

An actuating mechanism 38 pivots the pawl 72 into engagement with the ratchet teeth 74. The actuating mechanism 38 includes two distinct mechanisms for pivoting the pawl 72. The first mechanism includes an inertia weight 82 suspended from a portion of the frame 64. In certain situations, such as sudden vehicle deceleration, the inertia weight 82 pivots relative to the frame 64. When the weight 82 pivots, an upper portion 84 of the inertia weight pivots the pawl 72 into engagement with the ratchets 54.

Figure 2:
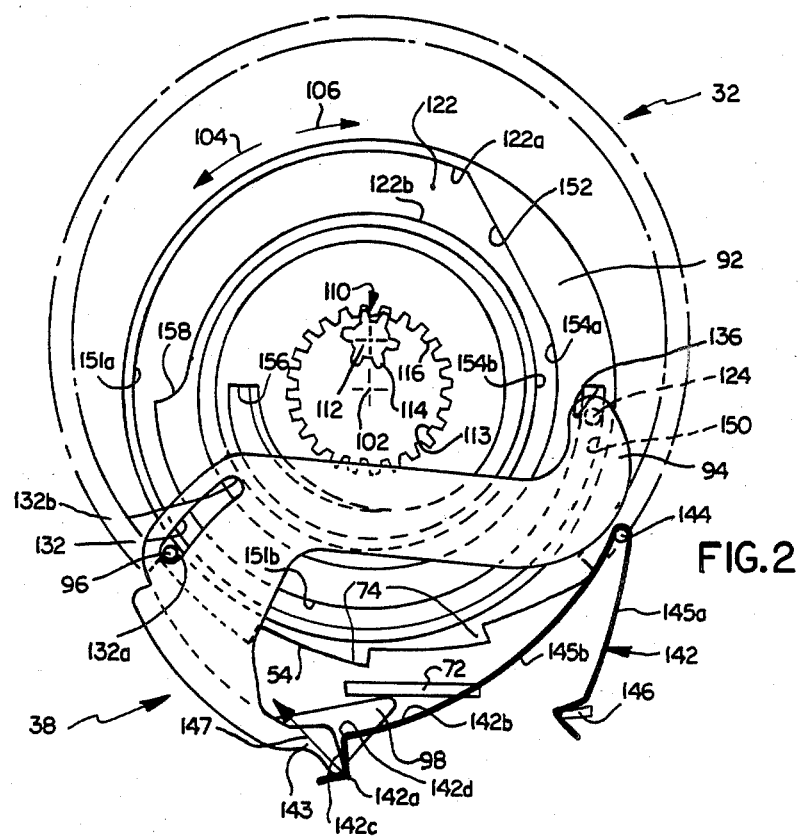
FIG. 2 is an enlarged schematic side view of the seat belt retractor of FIG. 1.
Figure 11:
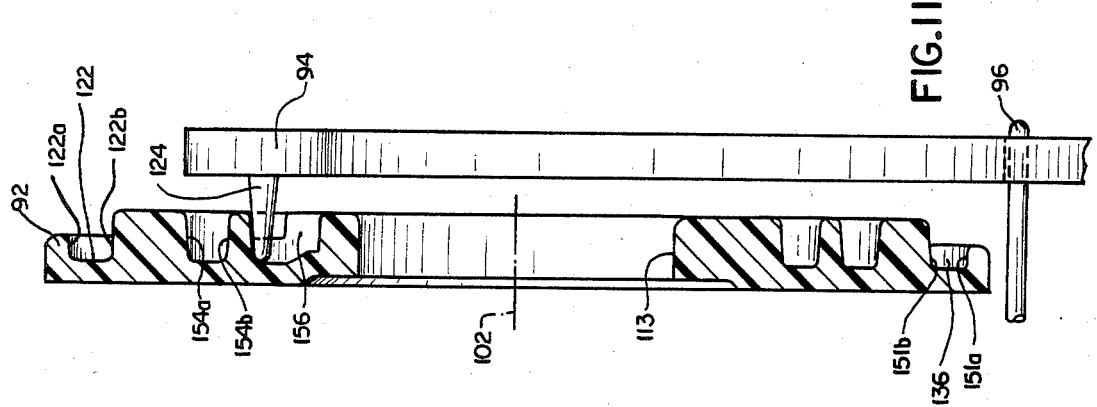
FIG. 11 is a cross sectional view, taken approximately along the line 11—11 of FIG. 7.

The second mechanism for pivoting the pawl 72 into engagement with the ratchets 54 includes a disc shaped cam member 92 (FIGS. 2 and 11). Upon withdrawal of a predetermined amount of belt webbing 52 from the spool 32, the cam member 92 actuates a lever 94 to pivot about a pin 96. The pin 96 is fixed to the retractor frame 64. Pivoting the lever 94 causes an actuating portion 98 of the lever to pivot the pawl 72 into engagement with the ratchets 54.

The cam member 92 is rotated about an axis 102 (FIG. 2) in response to rotation of the spool 32. The spool 32 and cam member 92 rotate in a first direction 104 when the seat belt webbing 52 is withdrawn from the spool 32. The spool 32 and cam member 92 rotate in a second direction 106 when the seat belt webbing 52 is wound, or retracted, onto the spool.

A gear mechanism 110 drives the cam member 92 in response to rotation of the spool 32. The gear mechanism 110 includes a pinion gear 112 connected with the shaft 62. The pinion gear 112 projects into a central opening 113 in the cam member 92. The pinion gear 112 has teeth 114 which mesh with gear teeth 116 formed in the cam member 92. The teeth 116 project radially into the opening 113 in the cam member 92. The numbers of teeth 114, 116 are selected to provide a gear or drive ratio of approximately 4:1 between the spool 32 and cam member 92. Thus the spool 32 revolves four times to every one revolution of the cam member 92.

The cam member 92 has a multi-loop spiral cam groove 122 in its radially extending surface that is presented away from the spool 32. The cam groove 122 is defined by radially spaced, axially extending cam surfaces 122a, 122b. The cam surface 122a is the radially outer surface of the groove 122. The cam surface 122b is the radially inner surface of the groove 122. Lever 94 has a cam follower portion 124 (best shown in FIG. 11) which projects axially into the multi-loop cam groove 122. The follower portion 124 cooperates with the surfaces 122a and 122b, as is described below.

The cam groove 122 also has a groove end surface 136 and a lever actuating surface 156 extending radially between the cam surfaces 122a and 122b and defining the limits that the follower portion 124 can travel in the groove 122. The outer cam surface 122a includes a circular portion 151a, a ramp portion 152, and a spiral portion 154a. The inner cam surface 122b includes a circular portion 151b, a ramp portion 158, and a spiral portion 154b.

The multi-loop cam groove 122 is arranged spirally on the cam member 92 for approximately two and one-half (2½) revolutions of the cam member. As the cam member 92 rotates about its axis 102 in the direction 104, the follower portion 124 rides along the outer cam surface 122a. Since the outer cam surface 122a has ramp 152 and spiral portion 154a, the follower portion 124 is forced to move closer to axis 102 as the cam member rotates in the direction 104. As the cam member 92 rotates about its axis 102 in the direction 106, the follower portion 124 rides along spiral portion 154b and ramp 158 of cam surface 122b and is forced to move away from axis 102, as is described in detail below.

The lever 94 has a slot 132 formed therein. The slot 132 is defined by first and second end surface portions 132a, 132b, respectively. The pin 96 projects into slot 132. The slot 132 enables the lever 94 to slide along the pin 96 as the follower portion 124 of the lever moves in response to rotation of cam member 92.

A spring 142 continually acts on lever 94. The spring 142 has two leg portions 145a, 145b forming a general V-shape. The leg portion 145a of the spring 142 has an end engaging a pin 146, which is fixed in the frame 64 of the retractor. The apex or point of the V extends around a pin 144.

The leg portion 145b of the spring 142 contacts the end portion 143 of the lever 94. The free end portion of the leg portion 145b includes a first corner 142a, a surface 142c, a second corner 142d, and surface 142b. When the spring 142 is installed, the leg portions 145a, 145b are compressed from their free state to exert a force 147 on the lever 94.

FIG. 2 illustrates the retractor 20 in a first, or initial position. In this initial position, the belt webbing 52 is fully retracted onto the spool 32. The follower portion 124 is illustrated as near the groove end surface 136 of the cam groove 122. In this initial position, the pin 96 engages the first end surface portion 132a of the slot 132.

In the initial position shown in FIG. 2, the spring 142 biases the lever 94 away from moving the pawl 72 to engage the ratchets 54. The spring 142 biases the first end surface portion 132a of the slot towards pin 96 and the follower portion 124 towards the radially outer cam surface 122a. The force 147 acts below the pin 96 as shown in the drawings. Therefore, the lever 94 is urged by the spring 142 to pivot about pin 96 in a clockwise direction and away from moving the pawl 72 to engage the ratchets 54.

FIG. 3 illustrates the cam member 92 rotated approximately ¾ of a revolution in the direction 104 from the position shown in FIG. 2. Rotation occurs in response to the seat belt webbing 52 being withdrawn from spool 32. During rotation of the cam member 92 from the position shown in FIG. 2 to the position shown in FIG. 3, the follower portion 124 engages only the circular portion 151a of the outer cam surface 122a. Throughout this first ¾ of a revolution of the cam member 92, the circular portion 151a does not force the lever 94 to move radially inward towards axis 102. Thus, the pin 96 is still located near the first end surface portion 132a of the slot when the parts are in the position shown in FIG. 3.

FIG. 4 illustrates the cam member 92 rotated approximately ¼ of a revolution in the direction 104 from the position shown in FIG. 3. During this movement, the follower portion 124 moves along the ramp portion 152. Since the follower portion 124 moves radially inwardly along the ramp portion 152 towards the axis 102, the lever 94 is also forced to move. The lever 94 moves relative to the pin 96 so that the pin 96 is now located away from the first end surface portion 132a of the slot 132. The follower portion 124 now engages the inwardly spiralling portion 154a of the outer cam surface 122a.

FIG. 5 illlustrates the cam member 92 rotated approximately 1¼ revolutions from the position shown in FIG. 4 in the direction 104. During this movement, the follower portion 124 moves along the spiral portion 154a and closer to axis 102. The lever 94 moves further relative to pin 96. The pin 96 is now located near the second end surface portion 132b of the slot 132.

FIG. 6 illustrates the cam member 92 rotated approximately ¼ of a revolution from the position in FIG. 5 in the direction 104. During this movement, the follower portion 124 moves further along the spiral portion 154a to engage the lever actuating surface 156. The lever 94 moves relative to the pin 96 so that the pin engages the second end surface portion 132b of the slot. Throughout the movement of the lever 94 from the initial position of FIG. 2, the spring 142 is still exerting a force 147 which biases the lever to rotate clockwise about pin 96. This force also continues to bias the actuating portion 98 of the lever 94 away from moving the pawl 72 into engagement with the ratchets 54.

FIG. 7 illustrates the cam member 92 rotated slightly further from the position in FIG. 6 in the direction 104. The cam member 92 position illustrated corresponds to the seat belt webbing 52 being near the fully withdrawn position. During this movement, the lever actuating surface 156 of the cam groove 122 still engages follower portion 124. As the cam member 92 rotates, the lever actuating surface 156 forces the follower portion 124 to rotate in the direction 104 without moving radially relative to axis 102. The lever 94 no longer moves relative to pin 96 along the slot 132, but instead pivots in a counterclockwise direction about pin 96. As the lever 94 pivots, the end portion 143 of the lever moves along the surface 142c of the spring 142 to corner 142d. As the lever pivots slightly further, the end portion 143 of the lever 94 moves around corner 142d and forces the leg portion 145b of the spring downwardly, as viewed in FIG. 7. Upon further pivoting of the lever 94, the end portion 143 of the lever moves around corner 142d and engages surface 142b of the spring 142. The actuating portion 98 of the lever 94 forces the pawl 72 to pivot and engage the ratchets 54.

FIG. 7 illustrates the pawl 72 in an actuated position contacting the crest of a ratchet tooth 74b. Upon a relatively small amount of further belt withdrawal the ratchets 54 rotate to the angular position illustrated in FIG. 8. The bias of the spring 142 forces the actuating portion 98 of the lever to pivot the pawl 72 further to engage the base of the tooth 74b and side 75a of tooth 74a. The position of the pawl 72 illustrated in FIG. 8 blocks further rotation of the spool 32 in the direction 104 to prevent any further withdrawal of belt webbing 52 from the spool. However, the spool 32 can rotate in the direction 106, during which the seat belt is retracted onto the spool.

In the position of FIG. 8, the spring 142 exerts a force 150 which acts above the pin 96, as shown in the drawings, tending to pivot the lever 94 counterclockwise about the pin, and biases the pawl 72. This maintains the pawl 72 in engagement with the ratchets 54. Rotation of the cam member 92 also forces the lever 94 to move so that the pin 96 is located away from the second end surface portion 132b of the slot.

Figure 9:
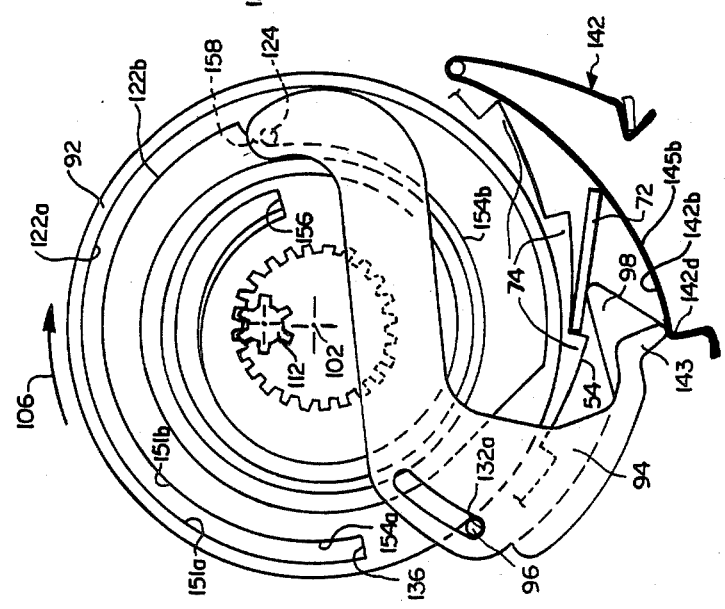

In the position of the parts illustrated in FIG. 8, the belt webbing 52 cannot be further withdrawn from the spool 32 but can be retracted onto the spool. The bias of spring 66 (FIG. 1) constantly urges the spool 32 to retract the belt webbing 52 onto the spool. FIG. 9 illustrates the cam member 92 rotated approximately two revolutions in the belt retraction direction 106 from the position in FIG. 8. As the belt retracts onto the spool 32, the pawl 72 is pushed by the crest of a tooth 74 away from that tooth 74 against the bias of spring 142. During rotation of the ratchets 54 in the direction 106, the pawl 72 rides over the crest of each tooth 74. The pawl 72 is forced back into the actuated position by the spring 142 bias to prevent rotation of the ratchet 54 in the direction 104 when the side 75 of each tooth rotates past the pawl in the direction 106. The follower portion 124 engages the spiral portion 154b or the inner cam surface 122b and moves radially away from axis 102 upon rotation of the cam member 92 in the direction 106. The lever 94 also moves relative to the pin 96 so that the pin engages the first end surface portion 132a of the slot again.

The follower portion 124 is illustrated contacting ramp portion 158 of the inner cam surface 122b. As the cam member 92 rotates slightly further in the direction 106 from the position in FIG. 9, the follower portion 124 engages the ramp portion 158 to pivot the lever 94 out at pin 96 in a clockwise direction. The leg portion 145b of the spring 142 is forced downward, as viewed in FIG. 9, as the end portion 143 slides along surface 142b and over corner 142d. The end portion 143 then moves past the corner 142d and the spring 142 snaps upwardly to the positionillustrated in FIG. 10. The end portion 143 of the lever again rests in corner 142a. The spring 142 applies force 147 again, which acts below pin 96, as viewed in the drawings, tending to pivot the lever 94 clockwise about the pin.

Figure 10:
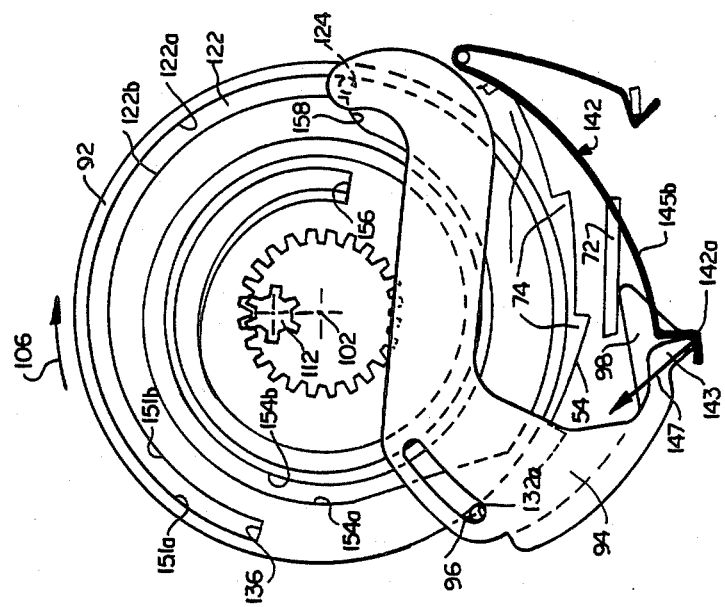

As the lever 94 pivots clockwise, the actuating portion 98 of the lever moves to the position illustrated in FIG. 10. This position permits the pawl 72 to fall or be forced by the ratchets 54 away from the position of FIG. 9 to disengage the pawl 72 from the ratchets 54. The belt webbing 52 can then be further retracted onto the spool 32 or withdrawn from it. The position of the lever 94 as illustrated in FIG. 10 is essentially the same as the initial position of the lever illustrated in FIG. 2. The initial position is maintained until a predetermined amount of belt webbing is withdrawn from the spool 32 to again actuate the locking means 36.

In summary, a seat belt retracror 20 is provided with a mechanism which locks to prevent withdrawal of seat belt 52 upon a predetermined amount of belt withdrawal. The mechanism includes a multi-loop cam groove 122 to move the lever 94 to pivot the pawl 72 into engagement with ratchets 54. The spool 32 is prevented from rotating in the belt 52 withdrawal direction 104, thereby preventing further withdrawal of the belt.

Having described a preferred embodiment, we claim:
1. A seat belt retractor comprising:
   a spool having seat belt webbing wound thereon;
   means for supporting said spool for rotation, said spool being rotatable in a belt withdrawal direction upon withdrawal of said seat belt webbing from said spool and being rotatable in a belt retracting direction upon wind-up of said belt webbing on said spool;
   means for locking said spool from rotation in the belt withdrawal direction including a ratchet fixed to said spool and a pawl movable into engagement with said ratchet to block said ratchet from rotation; and
   means for moving said pawl into engagement with said ratchet upon a predetermined amount of belt witndrawal including:

a cam member, drive means for rotating said cam member upon rotation of said spool and for rotating said cam member multiple times during withdrawal of said belt said predetermined amount, said cam member having a multi-loop spiral cam groove formed on the side surface of said cam member and extending around the axis of rotation of said cam member, and a lever movable by said cam groove to move said pawl into locking engagement with said ratchet when said belt has been withdrawn said predetermined amount.

2. A seat belt retractor as set forth in claim 1 wherein said cam member has a first portion for engaging said lever to move said pawl into locking engagement with said ratchet upon rotation of said cam member.

3. A seat belt retractor as set forth in claim 2 wherein said drive means for rotating said cam member comprises (a) a pinion gear mounted coaxially of said spool and having gear teeth formed on its radilly outer circumference and (b) gear teeth formed on a radially inner circumference of the cam member which mesh with the gear teeth formed on the pinion gear, said pinion gear and said cam member having a ratio between their respective rotations of approximately 4:1.

4. A seat belt retractor comprising:

a spool having a seat belt webbing wound thereon;

means for supporting said spool for rotation, said spool being rotatable in a belt withdrawal direction upon withdrawal of said seat belt webbing from said spool and being rotatable in a belt retracting direction upon wind-up of said belt webbing on said spool;

means for locking said spool from rotation in the belt withdrawal direction after a predetermined amount of belt is withdrawn from said spool including a ratchet fixed to said spool and a pawl movable into engagement with said ratchet after a predetermined amount of belt withdrawal; and means for moving said pawl into engagement with said ratchet including:

a cam member, drive means for rotating said cam member upon rotation of said spool and for rotating said cam member multiple times during withdrawal of said belt said predetermined amount, said cam member having a multi-loop spiral cam groove formed on the side surface of said cam member with a radially inner cam surface, a radially outer cam surface, and an actuating surface, said inner and outer cam surfaces extending around the axis of rotation of said cam member, said actuating surface extending radially from the axis of rotation of said cam member between said inner and outer cam surfaces, and means actuated by said actuating surface to move said pawl into locking engagement with said ratchet when said belt has been withdrawn said predetermined amount.

5. A seat belt retractor as defined in claim 4, wherein said means actuated by said actuating surface to move said pawl into locking engagement comprises a lever which is pivotally mounted, and said actuating surface engages a portion of the lever to effect pivotal movement of the lever to move said pawl into locking engagement with said ratchet.

6. A seat belt retractor as set forth in claim 5 wherein said drive means for rotating said cam member comprises (a) a pinion gear mounted coaxially of said spool and having gear teeth formed on its radially outer circumference and (b) gear teeth formed on a radially inner circumference of the cam member which mesh with the gear teeth formed on the pinion gear, said pinion gear and said cam member having a ratio between their respective rotations of approximately 4:1.

7. A seat belt retractor comprising:

a spool having seat belt webbing wound thereon;

means for supporting said spool for rotation, said spool being rotatable in a belt withdrawal direction upon withdrawal of said seat belt webbing from said spool and being rotatable in a belt retracting direction upon wind-up of said belt webbing on said spool;

means for locking said spool from rotation in the belt withdrawal direction including a ratchet fixed to said spool and a pawl movable into engagement with said ratchet to block said ratchet from rotation;

means for moving said pawl into engagement with said ratchet upon a predetermined amount of belt withdrawal including:

a cam member, drive means for rotating said cam member upon rotation of said spool and for rotating said cam member multiple times during withdrawal of said belt said predetermined amount, said cam member having a multi-loop cam groove extending around the axis of rotation of said cam member, and a lever movable by said cam groove to move said pawl locking engagement with said ratchet when said belt has been withdrawn said predetermined amount, said cam member having a first portion for engaging said lever to move said pawl into locking engagement with said ratchet upon rotation of said cam member, said drive means for rotating said cam member comprising (a) a pinion gear mounted coaxially of said spool and having gear teeth formed on its radially outer circumference, and (b) gear teeth formed on a radially inner circumference of the cam member which mesh with the gear teeth formed on the pinion gear, said pinion gear and said cam member having a ratio between their respective rotations of approximately 4:1; and a frame for supporting said spool for rotation, said frame having a pin thereon, said lever having a slot therein for receiving said pin, said pin and slot permitting movement of said lever relative to said pin, said cam member having a second portion for moving said lever into a position where said pin is located at one end of said slot upon rotation of said cam member, and said first portion of said cam member pivoting said lever when said pin is at said one end of said slot.

8. A seat belt retractor as defined in claim 7, further including a spring having a first portion for engaging said lever and biasing said lever to pivot in a first direction about said pin to move said pawl into engagement with said ratchet and a second portion for engaging said lever and biasing said lever to pivot in a second direction about said pin to enable said pawl to move away from engagement with the ratchet.

9. A seat belt retractor comprising:

a spool having seat belt webbing wound thereon;

means for supporting said spool for rotation, said spool being rotatable in a belt withdrawal direction upon withdrawal of said seat belt webbing from said spool and being rotatable in a belt retracting direction upon wind-up of said belt webbing on said spool;

means for locking said spool from rotation in the belt withdrawal direction after a predetermined amount of belt is withdrawn from said spool including a ratchet fixed to said spool and a pawl movable into engagement with said ratchet after a perdetermined amount of belt withdrawal; and means for moving said pawl into engagement with said ratchet including:

a cam member, drive means for rotating said cam member upon rotation of said spool and for rotating said cam member multiple times during withdrawal of said belt said predetermined amount, said cam member having a multi-loop cam groove with a radially inner cam surface, a radially outer cam surface, and an actuating surface, said inner and outer cam surface extending around the axis of rotation of said cam member, said actuating surface extending radially from the axis of rotation of said cam member between said inner and outer cam surfaces, and means actuated by said actuating surface to move said pawl into locking engagement with said ratchet when said belt has been withdrawn said predetermined amount, said actuated means comprising a lever which is pivotally mounted, and said actuating surface engaging a portion of the lever to effect pivotal movement of the lever to move said pawl into locking engagement with said ratchet, said drive means comprising (a) a pinion gear mounted coaxially of said spool and haivng gear teeth formed on its radially outer circumference and (b) gear teeth formed on a radially inner circumference of the cam member which mesh with the gear teeth formed on the pinion gear, said pinion gear and said cam member having a ratio between their respective rotations of approximately 4:1;

said means for supporting said spool for rotation, including a frame having a pin thereon, said lever having a slot therein for receiving said pin, said pin and slot permitting movement of said lever relative to said pin, said outer cam surface moving said lever into a position where said pin is located at a first end of said slot, said actuating surface for pivoting said lever being located so as to pivot said lever to move said pin is at said first end of said slot, and said inner cam surface moving said lever into a position where said pin is located at a second end of said slot and pivoting said lever to move said pawl out of engagement with said ratchet.

10. A seat belt retractor as defined in claim 9, further including a spring having a first portion for engaging said lever and biasing said lever to pivot in a first direction about said pin to move said pawl into engagement with said ratchet and a second portion for engaging said lever and biasing said lever to pivot in a second direction about said pin to enable said pawl to move away from engagement with the ratchet.

* * * * *